US007850556B2

(12) United States Patent
Meggiolan

(10) Patent No.: US 7,850,556 B2
(45) Date of Patent: Dec. 14, 2010

(54) INTERMEDIATE CONNECTION UNIT USABLE ON BOARD OF A BICYCLE

(75) Inventor: Mario Meggiolan, Creazzo (IT)

(73) Assignee: Campagnolo S.r.l., Vicenza (IT)

( * ) Notice: Subject to any disclaimer, the term of this patent is extended or adjusted under 35 U.S.C. 154(b) by 19 days.

(21) Appl. No.: 10/193,009

(22) Filed: Jul. 11, 2002

(65) Prior Publication Data

US 2003/0022743 A1   Jan. 30, 2003

(30) Foreign Application Priority Data

Jul. 11, 2001   (IT)   ............................ TO2001A0678

(51) Int. Cl.
*F16H 9/06* (2006.01)
*H01H 9/02* (2006.01)
*H01R 13/50* (2006.01)

(52) U.S. Cl. ............................ 474/70; 174/50.5; 174/58; 174/61; 439/535; 439/577

(58) Field of Classification Search ............ 474/80–82, 474/78, 70; 280/236, 238, 288; 224/929, 224/902, 412, 414; 74/471 R, 473.19, 473.13, 74/502.2, 506; 411/361, 436, 424; 403/16; 439/455, 722, 723, 527, 531, 535, 577, 676; 174/59, 65, 135, 50.5, 58, 60, 61; 315/371; 324/166–168, 171–174, 207.5, 207.2, 207.22
See application file for complete search history.

(56) References Cited

U.S. PATENT DOCUMENTS

| | | | | |
|---|---|---|---|---|
| 1,426,210 A | * | 8/1922 | O'Neil | 174/59 |
| 2,669,702 A | * | 2/1954 | Klostermann | 439/676 |
| 3,621,167 A | * | 11/1971 | Burke | 200/82 R |
| 3,676,733 A | * | 7/1972 | Eulenberg et al. | 315/371 |
| 3,676,837 A | * | 7/1972 | Newman | 439/455 |
| 3,774,145 A | * | 11/1973 | Vlahos | 439/715 |
| 3,848,224 A | * | 11/1974 | Olivero | 174/59 |
| 3,859,789 A | * | 1/1975 | Fawcett et al. | 60/325 |
| 4,143,557 A | * | 3/1979 | Wakebe et al. | 474/80 |
| RE30,758 E | * | 10/1981 | Lang | 74/594.4 |
| 4,412,828 A | * | 11/1983 | Darby | 474/81 |
| 4,479,693 A | * | 10/1984 | Uyeda et al. | 439/527 |
| 4,592,548 A | * | 6/1986 | Oldson | 473/66 |
| 5,103,125 A | * | 4/1992 | Ogden | 310/72 |
| 5,266,065 A | * | 11/1993 | Ancarani Restelli | 474/78 |
| 5,419,714 A | * | 5/1995 | Nagamine | 439/364 |

(Continued)

FOREIGN PATENT DOCUMENTS

DE   296 09 458 U1 * 12/1996

(Continued)

OTHER PUBLICATIONS

Japanese Office Action, Nov. 17, 2008.

*Primary Examiner*—Marcus Charles
(74) *Attorney, Agent, or Firm*—Volpe and Koenig, PC

(57) ABSTRACT

In a bicycle equipped with front derailleur and rear derailleur controlled each by a corresponding electrical actuator, there is provided an intermediate connecting unit, mounted underneath the crank case of the bicycle, having an input and two outputs connected to the two electrical actuators of the derailleurs. The connections can be permanent or detachable.

21 Claims, 3 Drawing Sheets

U.S. PATENT DOCUMENTS

| | | | | |
|---|---|---|---|---|
| 5,470,277 | A * | 11/1995 | Romano | 474/70 |
| 5,551,315 | A * | 9/1996 | Pikoulas | 474/70 |
| 5,599,244 | A | 2/1997 | Ethington | |
| 5,653,649 | A * | 8/1997 | Watarai | 474/78 |
| 5,681,234 | A * | 10/1997 | Ethington | 474/70 |
| 5,952,729 | A | 9/1999 | Shiratori et al. | |
| 6,155,871 | A * | 12/2000 | Machado | 439/535 |
| 6,162,140 | A * | 12/2000 | Fukuda | 474/70 |
| 6,305,237 | B1 * | 10/2001 | Ichida | 474/82 |
| 6,453,766 | B1 * | 9/2002 | Ose | 74/506 |
| 6,597,166 | B2 * | 7/2003 | Meggiolan | 324/174 |

FOREIGN PATENT DOCUMENTS

| | | |
|---|---|---|
| IT | 2000A000869 | 9/2000 |
| JP | 06115473 A | 4/1994 |
| JP | 07047987 A * | 2/1995 |
| JP | 7-101376 | 4/1995 |
| JP | 8-251755 | 9/1996 |
| JP | A-H10-511621 | 11/1998 |
| JP | 11-790061 | 3/1999 |
| JP | 2001-310735 | 11/2001 |
| WO | WO 91/17078 | 11/1991 |

* cited by examiner

INTERMEDIATE CONNECTION UNIT USABLE ON BOARD OF A BICYCLE

FIELD OF INVENTION

The present invention relates to an intermediate connection unit usable on board of a bicycle equipped with front derailleur and rear derailleur which are provided with electrical actuators. An electronic control unit that is connectable to the aforesaid two electrical actuators is contained in a housing designed to be mounted on the bicycle frame.

BACKGROUND

A device of the type specified above has already been proposed in U.S. Patent Publication No. 20010042767 A1, which is assigned to the assignee of the present applicant, and incorporated herein by reference. In the device, the box or housing containing the electronic control unit is mounted on the down tube of the bicycle frame in a position corresponding to the area of fixing of the bottle cage. Associated to the box for containing the electronic control unit is a battery holder. In the further Italian Patent Application No. TO2000A000869, filed on Sep. 15, 2000, which is assigned to the assignee of the present applicant, and incorporated herein by reference, the applicant has proposed an improvement of the known device to provide a quick connection between the battery holder and the box containing the electronic control unit, which also enables a quick electrical connection between the power supply batteries and the electronic control unit.

In the previously proposed solution, the electronic control device is designed to be connected both to the actuator of the front derailleur of the bicycle and to the actuator of the rear derailleur for motor-driven control of said derailleurs. It is to be noted that an electronically controlled motor-driven gear-change solution that uses electrical actuators for controlling the front derailleur and the rear derailleur has for some time been proposed as described and illustrated in U.S. Pat. No. 5,470,277 and which is incorporated by reference in the present application.

In the previously proposed solution, the box of the electronic control device is mounted on the down tube of the bicycle frame in a position corresponding to the area of anchorage of the bottle cage. From the electronic control unit there exit two cables which are designed to be connected respectively to be connected to the electrical actuator of the front derailleur and to the electrical actuator of the rear derailleur. In the practical applications, the connection of the two cables for connection to the electronic control unit is made by embedding the terminal part of the cables in the plastic material that forms the body of the box, so as to obtain hermetically sealed connections. This gives rise to a corresponding complication in the operations of wiring of the control unit and involves the added aesthetic drawback deriving from the arrangement of two connection cables on the outside of the down tube of the bicycle frame.

In order to overcome the aforesaid drawbacks, the purpose of the present invention is to provide an intermediate connection unit usable on board of a bicycle, characterized by comprising a casing designed for being mounted on the bicycle, at least one input and at least two outputs.

With the arrangement of the previously mentioned intermediate connection unit, the electronic control unit has a single cable directed towards the two electrical actuators for controlling the bicycle derailleurs, through the intermediate connection unit from which there exit two cables, one directed to the front derailleur and the other to the rear derailleur, can be set in an area of the frame less in view. In a preferred embodiment of the invention, the housing of the intermediate connection unit is designed to be mounted underneath the bottom bracket shell or crank case of the bicycle. In this position, bicycles with flexible cable gear control are provided with an auxiliary support for guiding the two control cables, i.e., that of the front derailleur and that of the rear derailleur. In the case of the present invention, in place of the said support there is mounted the housing of the aforesaid intermediate connection unit, the said unit being connected to the electronic control unit by means of a single connection cable and having at least two outputs connected to the two electrical actuators. Of course, the intermediate connection unit can be provided also with other outputs, for example for connection to accessory members, such as sensors or the like, as well as with other inputs in addition to that connected to the control unit.

With the above characteristics, the wiring of the electronic control unit is simpler, and the device is also improved from the aesthetic point of view in that it provides a single cable set on the outside of the down tube of the bicycle frame.

SUMMARY

The present invention provides an electronic control assembly and a bicycle incorporating an intermediate connection unit which will selectively receive and output signals to activate an electrical component.

BRIEF DESCRIPTION OF THE DRAWING(S)

Further characteristics and advantages of the present invention will emerge from the ensuing description, with reference to the attached drawings, in which.

DETAILED DESCRIPTION OF THE PREFERRED EMBODIMENT(S)

Figure 1:
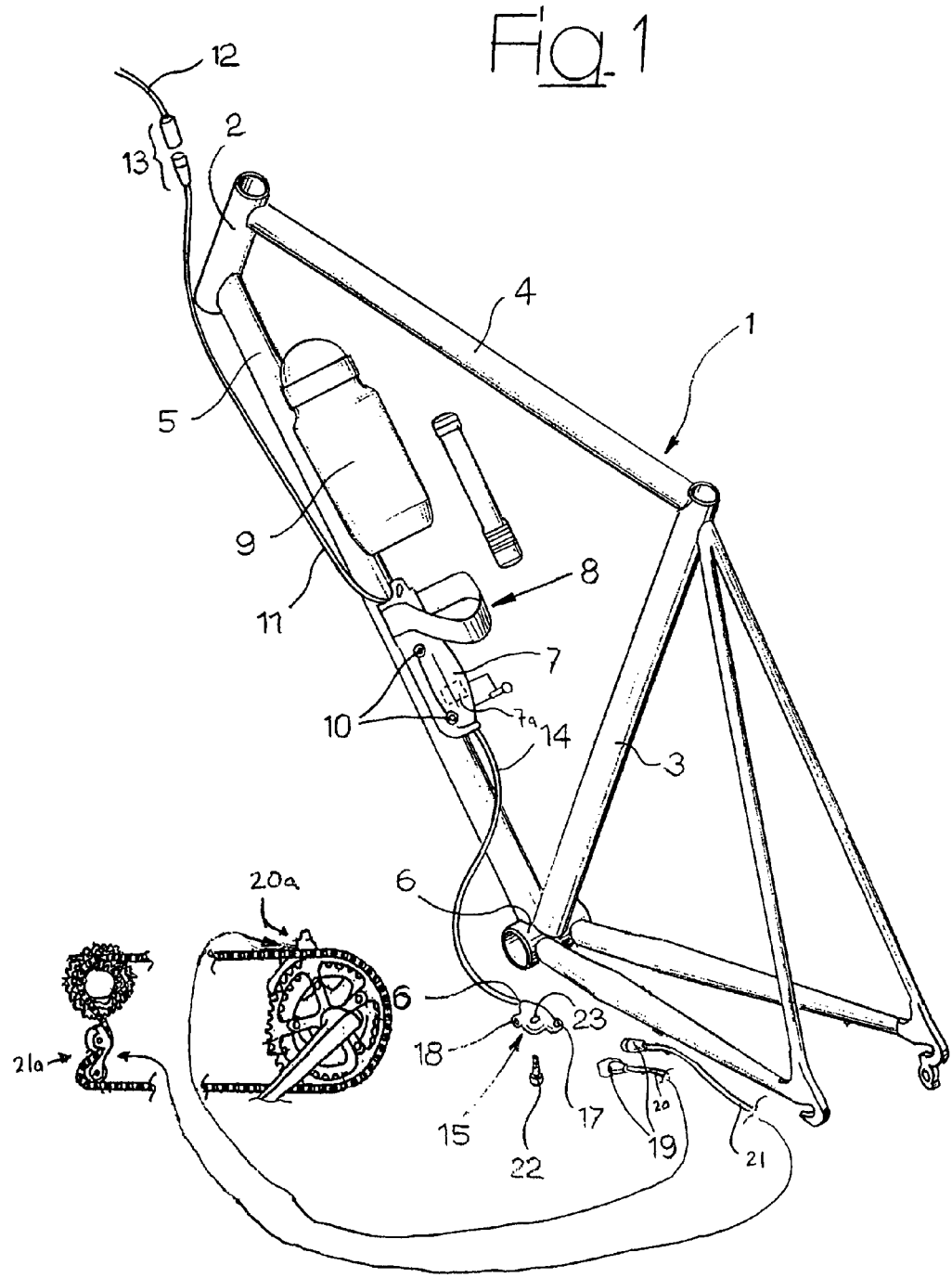
FIG. 1 is a schematic perspective view illustrating the intermediate connection unit and the electronic assembly according to the invention mounted on a bicycle frame.

In FIG. 1, the reference number 1 designates, as a whole, a bicycle frame comprising a head tube 2 and a seat tube 3 connected together by a top tube 4 and a down tube 5. The frame includes a bottom-bracket shell (or crank case) 6 where the down tube 5 and seat tube 3 converge.

In line with what illustrated in the prior published U.S. Patent Publication No. 20010042767 A1, the assembly comprises a box 7 containing an electronic control unit which governs two electrical actuators (not illustrated) for operating the front derailleur and the rear derailleur of the bicycle in a motor driven gear change system of the type forming the subject of the U.S. Pat. No. 5,470,277. The electronic control unit is moreover designed to be connected to an on board computer/processor 7a typically mounted on the handlebars of the bicycle and to the push buttons for actuating the front derailleur 20a and the rear derailleur 21a, which are shown in a sample side view, said push buttons being preferably integrated in the brake lever supports, which are also mounted on the handlebars of the bicycle, as noted in U.S. Pat. No. 5,470, 277.

Again, the box 7 of the electronic control unit is built into an assembly 8 for supporting a bottle cage 9, which is fixed to the down tube 5 by means of screws 10 that engage the usual holes traditionally provided in the down tube 5 for fixing the bottle-cage assembly.

Exiting from the box 7 of the electronic control unit is a single cable 11 for connection to the cycle computer, not shown, which is provided with a cable 12 of its own connected to the cable 11 by means of a connector 13 and a single cable 14 for connection to the two electric actuators of the bicycle derailleurs. The ends of the cables 11, 14 connected to box 7 on preferably embedded in the body, of plastic material forming the box 7 so as to ensure that those connections are hermetically sealed.

As previously stated, the connection of the electronic control unit to the two electrical actuators is obtained by means of a single cable 14 which extends along the down tube 5. This can be obtained in so far as, according to the present invention, between the electronic control unit 7 and the two actuators, not shown, there is set an intermediate connection unit 15 having a single input 16 connected to the cable 14 and two outputs 17, 18 designed to be connected to the connectors 19 of two cables 20, 21 for output an electric power supply to the selected electrical actuator(s) of the front derailleur or the rear derailleur, respectively.

Figure 3:
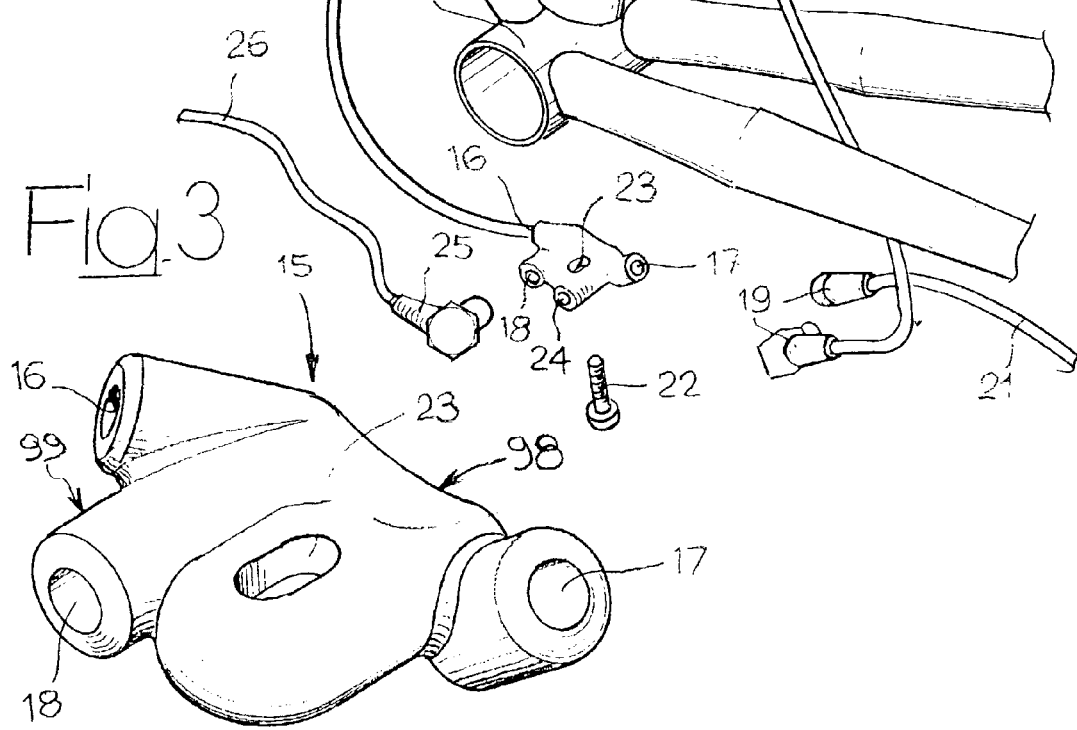
FIG. 3 illustrates an enlarged view of the intermediate connection unit according to the present invention.
Figure 4:
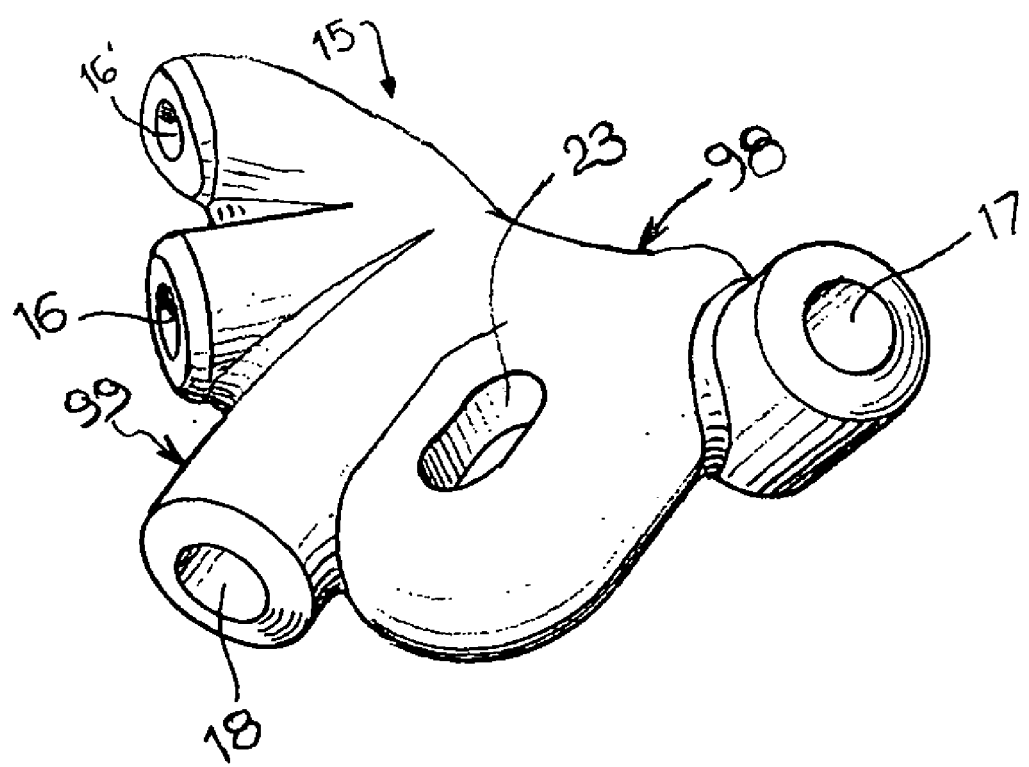
FIG. 4 illustrates a cross sectional view of the intermediate connection unit attached below the crank case of a bicycle.

The intermediate connection unit 15 (see FIG. 3) presents a housing 99 made of plastic material so as to ensure that its content is hermetically sealed. The housing 99 presents a shape with curved portion 98, so that it can be easily connected to a cylindrical fixing member, such as crank case 6, and attached through hole 23. As shown in FIG. 4, the intermediate connection unit 15 is mounted underneath the crank case 6 by means of a screw 22 which passes through the hole 23 of the housing 99 and is threaded into the wall of the crank case 6. Due to the shape of its housing 99, the intermediate connection unit 15 can be fixed to any part of the bicycle.

Figure 2:
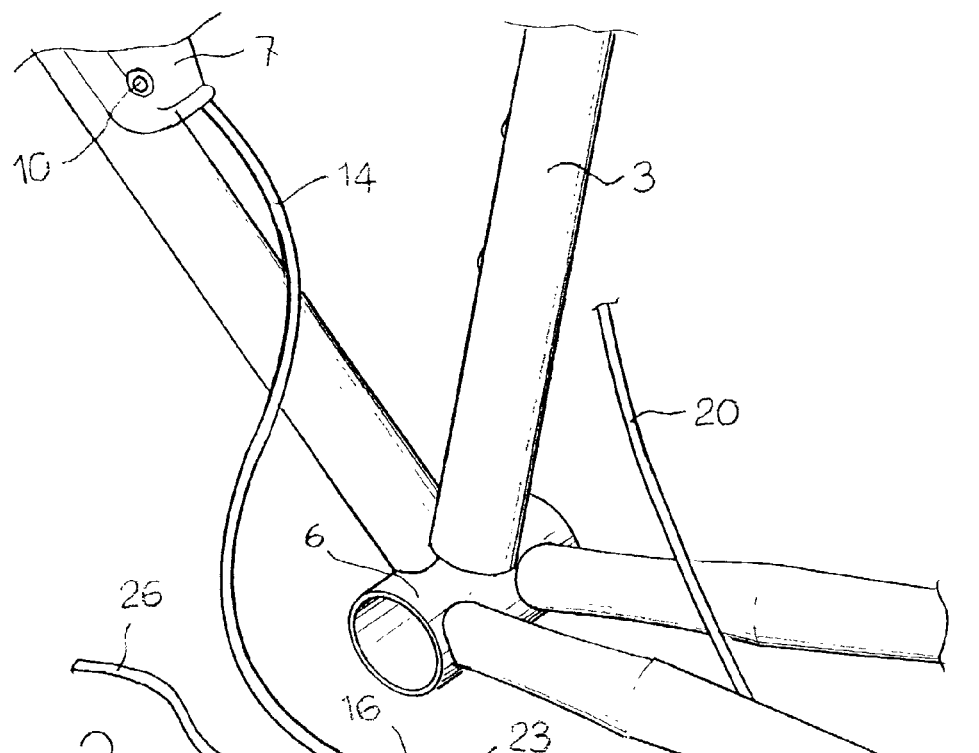
FIG. 2 illustrates a detail of FIG. 1, according to a possible variant.

FIG. 2 illustrates a variant in which the intermediate connection unit 15 has an auxiliary output 24 for connection of an auxiliary connector 25 connected, by means of a cable 26, to an auxiliary member, such as a sensor device for a cycle parameter (such as pedal cadence) provided on the bicycle.

The intermediate connection unit 15 can present other inputs and other outputs, in any number, so as to act as a "switchboard" having any number of inputs and any number of outputs to which sensors, actuators, control units and so on can be connected. FIG. 4, for example, shows an intermediate connection unit 15 with two inputs 16, 16'.

It is also to be noted that the inputs (16) and the outputs (17, 18, 24) of the intermediate connection unit 15 can engage the cables 14, 20, 21, and 26 permanently or detachably. When the cables are detachable, or removably connected, the cables 14, 20, 21 and 26 can be easily connected to the intermediate connection unit 15 and easily disconnected from it. It is also possible that some of the inputs and/or outputs are of the permanent type and the remaining ones of the detachable type.

The advantages of the described intermediate connection unit are clear. In particular, the shape of the casing allows that the unit can be fixed to any part of the bicycle and that allows to have the minimum of cables on the frame of the bicycle. Further, the detachable connections allow that the sensors and the actuators can be very easily disconnected from the unit and replaced or repaired, without the need to dismount the entire intermediate connection unit.

What is claimed is:

1. A non-processing intermediate connection unit for a bicycle, comprising:
    a non-processing casing having a curved portion configured for mounting on a bicycle frame, said curved portion defining a through aperture for a fastener to attach said casing to said bicycle frame;
    at least one input for receiving an electrical cable; and
    at least two non-processing outputs for receiving an electrical cable and passing an electric signal after it is passed through the non-processing casing, the at least one input being located on an opposite end of the casing from at least one of the at least two outputs.

2. The connection unit of claim 1, wherein the inputs and outputs are shaped to enclose an end of the cable.

3. The connection unit of claim 1, wherein said casing is mounted underneath the crank case of the bicycle.

4. A bicycle with a non-processing intermediate connection unit, the unit comprising:
    a non-processing casing having a curved portion configured for mounting on a bicycle frame, said curved portion defining a through aperture for a fastener to attach said casing to said bicycle frame;
    at least one input for receiving an electrical cable;
    and at least two non-processing outputs for receiving an electrical cable and passing an electric signal after it is passed through the non-processing casing, the at least one input being located on an opposite end of the casing from at least one of the at least two outputs.

5. The intermediate connection unit according to claim 4, comprising one input and three outputs.

6. The intermediate connection unit according to claim 4, wherein some of the inputs and some of the outputs are adapted to permanently receive a cable and the remaining ones are adapted to removably receive a cable.

7. The intermediate connection unit according to claim 4, wherein said casing is hermetically sealed.

8. The intermediate connection unit according to claim 4, wherein said casing is made of a plastic material.

9. An electrical intermediate connection unit for attachment to the frame of a bicycle comprising a non-processing housing having a curved portion configured for complementary mounting on the bicycle frame crankcase, said curved portion defining a through aperture for a fastener to attach said casing to said bicycle frame, and including at least one input for receiving an electrical cable and at least two non-processing outputs that are electrically connected through the unit to allow an electrical control signal to pass directly therethrough, the at least one input being located on an opposite end of the casing from at least one of the at least two outputs.

10. The intermediate connection unit according to claim 9, further comprising multiple inputs and outputs.

11. The intermediate connection unit according to claim 9, wherein the connections of the inputs and outputs are permanently affixed to the unit.

12. The intermediate connection unit according to claim 9, wherein connections of the inputs and outputs are detachable from the unit.

13. The intermediate connection unit according to claim 9, wherein said housing is hermetically sealed.

14. An intermediate connection unit configured for mounting on a the bottom of a bicycle crankcase comprising a non-processing casing housing having a curved portion wherein said curved portion of the casing presents a through hole through which a fastener engages the bicycle crankcase and affixes the casing to the bicycle crankcase, at least one input for receiving an electrical cable and at least two non-processing outputs, the at least one input being located on an opposite end of the casing from at least one of the at least two outputs.

15. An intermediate electrical connection unit for a bicycle, comprising a non-processing casing having a curved portion defining a through aperture for a fastener to attach said casing to a bicycle frame configured for mounting on the bicycle having electrically operated elements, at least one input for receiving an end of a cable carrying an electrical signal and at least two outputs for engaging other cables that transmit the electrical signal, wherein the connection performs no processing, the at least one input being located on an opposite end of the casing from at least one of the at least two outputs.

16. The intermediate electrical connection unit of claim 15 comprising one input and three outputs.

17. The intermediate electrical connection unit of claim 15 wherein said input and output cables are permanently attached thereto.

18. The intermediate electrical connection unit of claim 15 wherein said inputs and said outputs each include locations that removably receive the cables.

19. The intermediate connection unit of claim 15 wherein some of the inputs and some of the outputs permanently receive the cables and the remaining ones removably receive the cables.

20. The intermediate connection unit of claim 15, wherein the inputs and outputs are shaped to enclose the end of the cable.

21. The intermediate connection unit of claim 15, wherein said casing is mounted underneath the crank case of the bicycle.

* * * * *